United States Patent
Avinash et al.

(10) Patent No.: US 6,579,239 B1
(45) Date of Patent: Jun. 17, 2003

(54) SYSTEM AND METHOD FOR AUTOMATIC ADJUSTMENT OF BRIGHTNESS AND CONTRAST IN IMAGES

(75) Inventors: Gopal B. Avinash, New Berlin, WI (US); Pinaki Ghosh, Bangalore (IN); Kunnampally Gopalakrishnan Ramesh, Bangalore (IN); Amit Saxena, Bangalore (IN)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 10/063,275

(22) Filed: Apr. 5, 2002

(51) Int. Cl.[7] .............................. A61B 8/00; A61B 8/14
(52) U.S. Cl. ...................................... 600/443; 600/458
(58) Field of Search ................... 600/443, 454, 600/455, 451, 437, 447, 440; 382/128, 168–172, 254; 348/163; 128/916

(56) References Cited

U.S. PATENT DOCUMENTS

| | | | | | |
|---|---|---|---|---|---|
| 5,492,125 | A | * | 2/1996 | Kim et al. | 600/443 |
| 5,793,883 | A | * | 8/1998 | Kim et al. | 600/443 |
| 6,048,311 | A | * | 4/2000 | Washburn et al. | 600/443 |
| 6,162,176 | A | * | 12/2000 | Washburn et al. | 600/454 |

* cited by examiner

Primary Examiner—Marvin M. Lateef
Assistant Examiner—Ruby Jain
(74) Attorney, Agent, or Firm—Ostrager Chong & Flaherty LLP

(57) ABSTRACT

A system and a method for adjusting contrast and brightness in an image, e.g., an ultrasound image. The contrast and brightness are adjusted by processing global pixel intensity data to form a set of data representing a histogram. An algorithm is then employed to filter the pixel intensity values as a function of certain characteristics of the histogram data. The algorithm is designed to enhance contrast and brightness without affecting the near-field region in the ultrasound image. The filtering operations may be performed by a dedicated processor or by a fast general-purpose computer.

23 Claims, 8 Drawing Sheets

SYSTEM AND METHOD FOR AUTOMATIC ADJUSTMENT OF BRIGHTNESS AND CONTRAST IN IMAGES

BACKGROUND OF THE INVENTION

This invention generally relates to imaging for the purpose of medical diagnosis. In particular, the invention relates to methods for imaging tissue and blood flow by detecting ultrasonic echoes reflected from a scanned region of interest in a human body.

Conventional ultrasound scanners are capable of operating in different imaging modes. In the B mode, two-dimensional images can be generated in which the brightness of each display pixel is derived from the value or amplitude of a respective acoustic data sample representing the echo signal returned from a respective focal position within a scan region.

In B-mode imaging, an ultrasound transducer array is activated to transmit beams focused at respective focal positions in a scan plane. After each transmit firing, the echo signals detected by the transducer array elements are fed to respective receive channels of a receiver beam-former, which converts the analog signals to digital signals, imparts the proper receive focus time delays and sums the time-delayed digital signals. For each transmit firing, the resulting vector of raw acoustic data samples represents the total ultrasonic energy reflected from a succession of ranges along a receive beam direction. Alternatively, in multi-line acquisition two or more receive beams can be acquired following each transmit firing.

In conventional B-mode imaging, each vector of raw acoustic data samples is envelope detected and the resulting acoustic data is compressed (e.g., using a logarithmic compression curve). The compressed acoustic data is output to a scan converter, which transforms the acoustic data format into a video data format suitable for display on a monitor having a conventional array of rows and columns of pixels. This video data is referred herein as "raw pixel intensity values". The frames of raw pixel intensity data are mapped to a gray scale for video display. Each gray-scale image frame, hereinafter referred to as "gray-scale pixel intensity values", is then sent to the video monitor for display. In the case where a one-to-one gray-scale mapping is in effect, the raw and gray-scale pixel intensity values will be one and the same.

In ultrasound imaging, the diagnostic quality of images presented for interpretation may be diminished for a number of reasons, including incorrect settings for brightness and contrast. If one tries to improve the image with available methods for adjusting brightness and contrast, this has the undesirable result of increasing the pixel intensity values corresponding to the near-field region as well. Because the near-field region is inherently bright, the desired result is generally not achieved. There is a need for a filtering technique that will enhance the image brightness and contrast without affecting the image in the near-field region.

SUMMARY OF THE INVENTION

The invention is directed to improving images, e.g., ultrasound images, by means of contrast enhancement. The invention claimed herein is not limited in its application to ultrasound imaging systems.

One embodiment of the present invention is a method for adjusting contrast in an ultrasound image. In another embodiment, both contrast and brightness are adjusted. The contrast and brightness are adjusted by processing global pixel intensity data to form a set of data representing a histogram. An algorithm is then employed to filter the pixel intensity values as a function of certain characteristics of the histogram data. The algorithm is designed to enhance contrast and brightness without affecting the near-field region in the ultrasound image. The processes that implement the algorithm will be generally referred to herein as "filtering". The filtering operations may be performed by a dedicated processor or by a fast general-purpose computer.

Another embodiment of the invention comprises a system for enhancing contrast and, optionally, brightness in an ultrasound image. The system incorporates a computer programmed to filter pixel intensity values in accordance with the aforementioned algorithm.

The first step of the algorithm is to compute a set of histogram data from a set of pixel intensity values generated by an image processor. The histogram data comprises counts representing the number of pixels having pixel intensity values belonging to a respective bin, each bin being defined to encompass non-overlapping subsets of pixel intensity values, each subset comprising either a different pixel intensity value or a different range of pixel intensity values. In the next step, the pixel intensity values are decreased in those bins having pixel intensity values in a first range of lowest pixel intensity values. This decrease in pixel intensity values is implemented by multiplying each pixel intensity value in the first range by a multiplication factor less than unity and greater than zero. This increases the contrast of the image. In a third step, the pixel intensity values are decreased in those bins having pixel intensity values in a second range of pixel intensity values excluding at least a third range of highest pixel intensity values, wherein the first through third range do not overlap with each other. This decrease in pixel intensity values in the second range is implemented by logarithmic filtering each pixel intensity value in the second range. This further increases the contrast of the image.

Additional steps of the algorithm are directed to enhancing the brightness of the image by either increasing or decreasing each pixel intensity value. Optionally the image quality can be further improved by stretching the histogram using the ATO function.

The method disclosed herein uses the image's global information to optimize image brightness and contrast. It changes the grayscale values to the optimal region of the histogram. The method improves the system operator's productivity and throughput while improving image quality.

DETAILED DESCRIPTION

Figure 1:
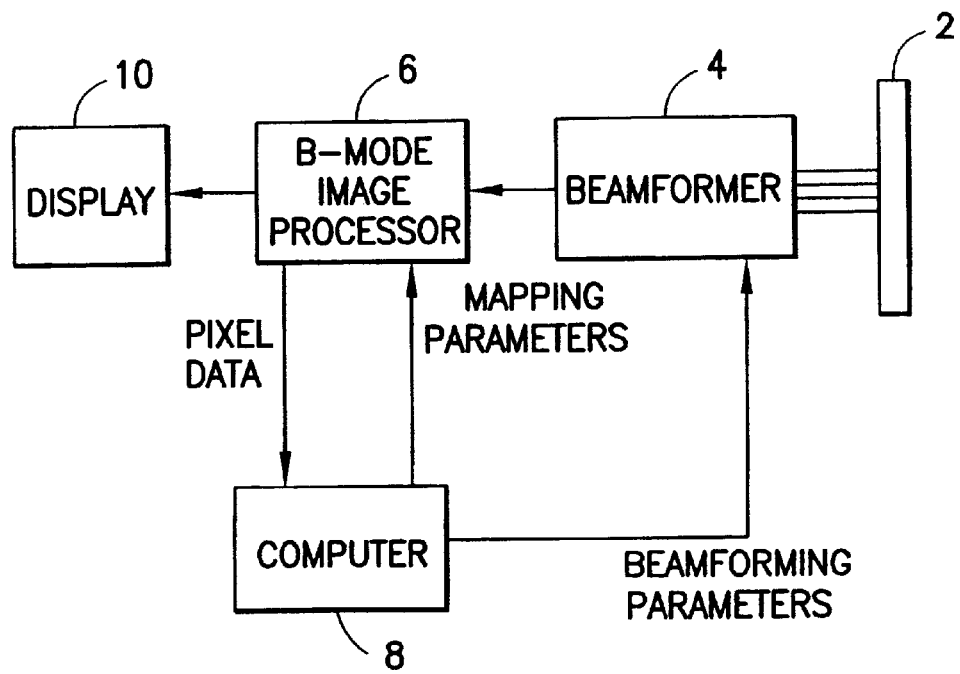
FIG. 1 is a block diagram generally showing a typical B-mode ultrasound imaging system.

Referring to FIG. 1, a B-mode ultrasound imaging system typically comprises a transducer array 2, a beamformer 4, a B-mode image processor 6, a host computer 8 and a display monitor 10. The transducer array 2 comprises a multiplicity of transducer elements which are activated by a transmitter in beamformer 4 to transmit an ultrasound beam focused at a transmit focal position. The return RF signals are detected by the transducer elements and then dynamically focused at successive ranges along a scan line by a receiver in beamformer 4 to form a receive vector of raw acoustic data samples. The beamformer output data (I/Q or RF) for each scan line is passed through a B-mode image processor 6, which processes the raw acoustic data into pixel image data in a format suitable for display by the display monitor 10.

System control is centered in a host computer 8, which accepts operator inputs through an operator interface (not shown), analyzes the acquired data and controls the various subsystems based on operator inputs and the results of data analysis. The host computer 8 may be programmed to perform the following functions: (1) providing transmit and beamforming parameters to the beamformer 4; (2) providing gray mappings to the B-mode image processor 6; (3) retrieving an image frame from memory, re-scaling that image frame and then sending the re-scaled image to the display monitor for display in a zoom mode; and (4) providing data compression curves to the B-mode image processor 6. Preferably, the gray map, beamforming parameters and compression curves are provided in the form of lookup tables stored in random access memory. Although FIG. 1 depicts separate paths for the communications to and from the host computer 8, it will be readily appreciated that these communications may take place over a common channel or system bus.

Figure 2:
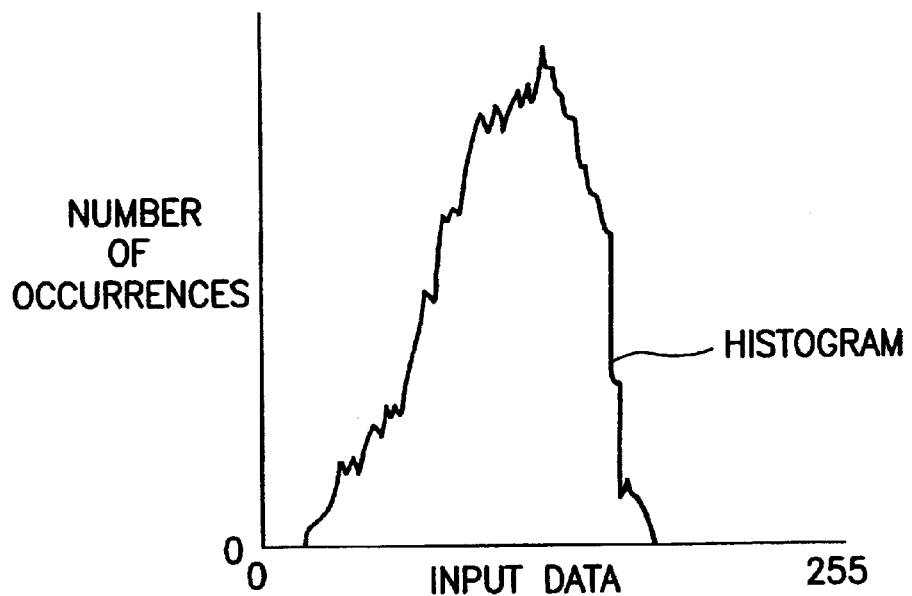
FIG. 2 is a graph representing a pixel intensity histogram, the pixel intensity values being plotted along the horizontal axis and the number of occurrences within each bin being plotted along the vertical axis.

Furthermore, the host computer may be programmed to retrieve successive image frames of raw pixel intensity data from image processor 6 and then compute a respective histogram for a region of interest or for an entire image frame. A typical pixel intensity histogram is shown in FIG. 2. Computing a histogram involves the steps of dividing the range of possible pixel intensity values into a series of non-overlapping bins of equal length, assigning each pixel intensity value in the region of interest or the image frame to a respective bin having that value, and counting the number of pixels in each bin for that image frame. FIG. 2 is a representative graph of number of occurrences as a function of pixel intensity values. Successive histograms can be stored in buffer memory in the host computer 8. The host computer can be programmed to repeatedly compare the current histogram with the preceding histogram. If there is a large change from one histogram to the next, followed by a predetermined number of image frames showing a stabilized pixel intensity histogram, then the computer can be programmed to automatically re-optimize the mapping and/or compression parameters and send those re-optimized parameters to the image processor 6. The image processor 6 then uses those parameters when it processes subsequent image frames of acoustic data.

Figure 3:
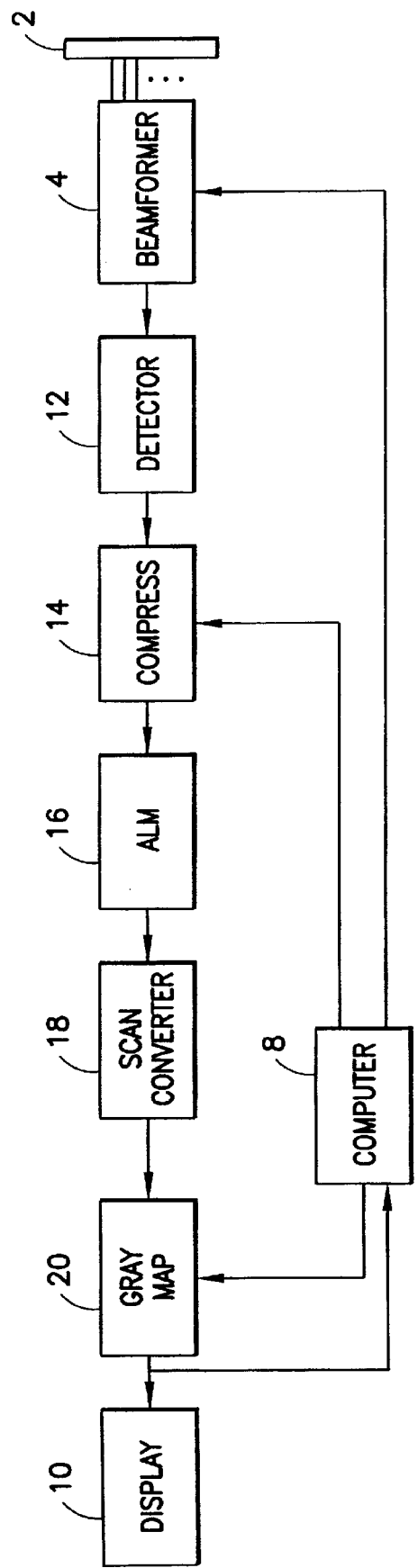
FIG. 3 is a block diagram showing a typical B-mode ultrasound imaging system.

FIG. 3 shows a signal path for one type of B-mode ultrasound imaging system. The received RF (or its equivalent I/Q pair) data output by the beamformer 4 is envelope detected by detector 12 on a vector-by-vector basis. Then the detected data is compressed in data compression block 14 (which preferably comprises a lookup table loaded by the host computer 8 into a random access memory) to reduce the dynamic range for a pixel value (typically 8 bits) display. An acoustic line memory (ALM) 16 accumulates vectors of compressed acoustic data for one sweep across the array, to form a two-dimensional image. A scan converter 18 transforms the R-⊖ or X-Y acoustic data format into an X-Y pixel or video data format, thus forming the raw pixel intensity data. The raw pixel intensity data is then mapped into gray-scale values by the gray map 20 for display on monitor 10. Preferably the gray mapping also comprises a lookup table loaded into random access memory by the host computer.

Figure 4A:
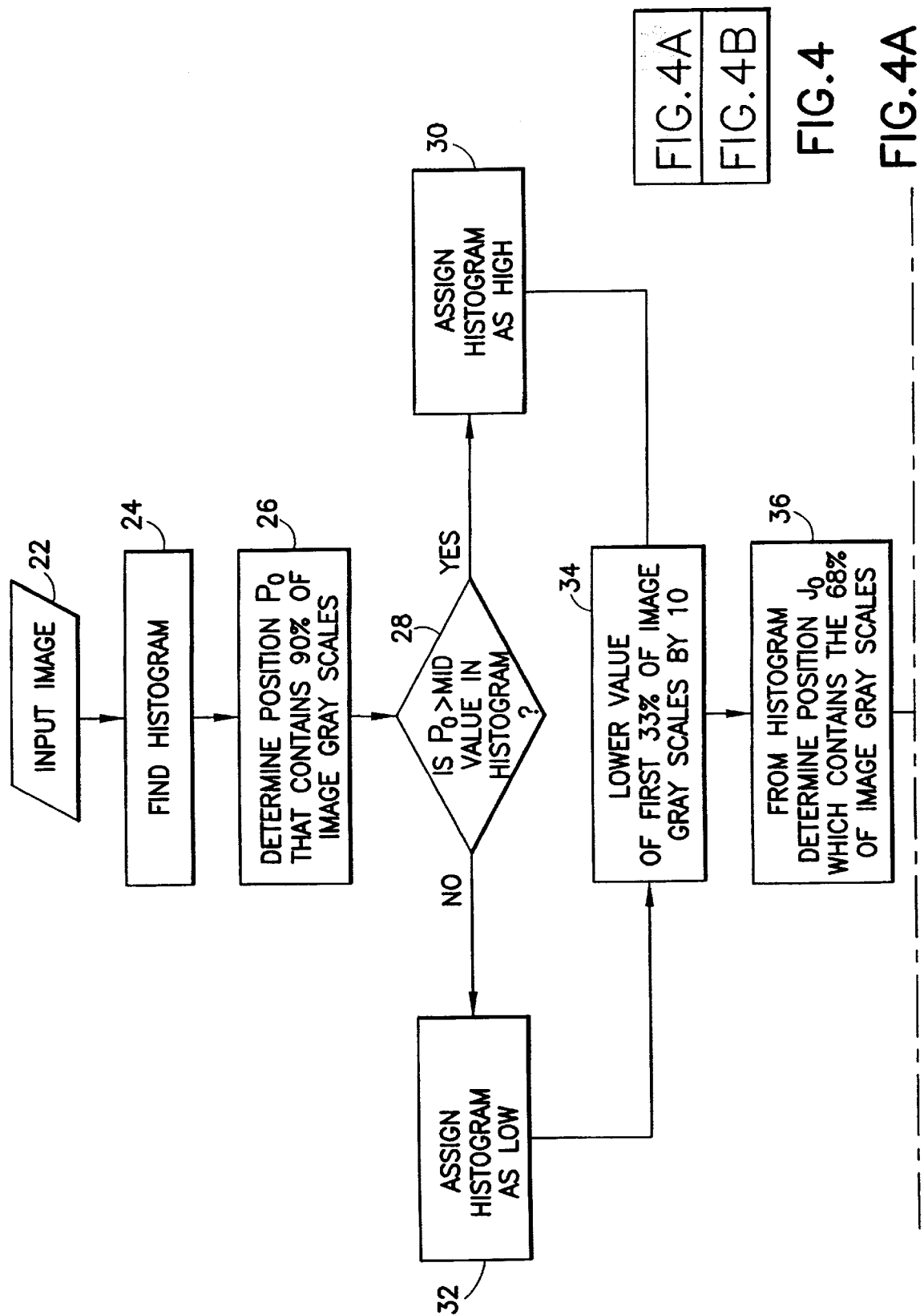
FIG. 4 (consisting of two sheets respectively labeled FIG. 4A and FIG. 4B) is a flowchart showing the algorithms for enhancing contrast and brightness in accordance with one embodiment of the invention.
Figure 4B:
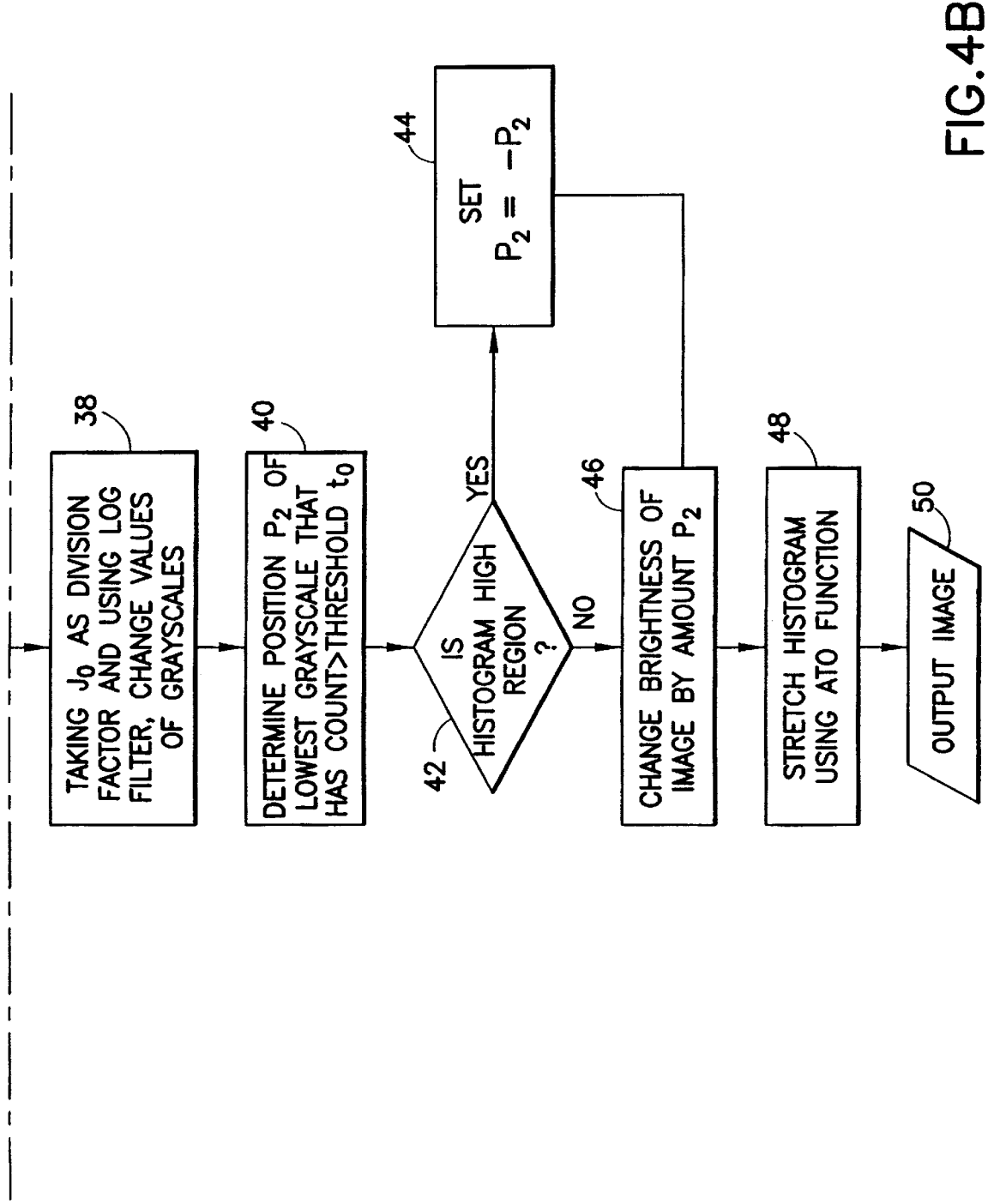

In accordance with one embodiment of the present invention, the gray-scale pixel intensity values are automatically filtered by the host computer to improve brightness and contrast. FIGS. 4A and 4B show a flowchart of the steps of the method in accordance with one embodiment. In the first step 22 (shown in FIG. 4A), a new image frame is read out by the system computer either directly from the X-Y display memory in the scan converter (as shown in FIG. 3) or through a cine memory (not shown in FIG. 3). In the second step 24, an image pixel intensity histogram for the inputted image frame is computed by counting the number of pixels that fall within each pixel value bin. For an 8-bit pixel display, the smallest pixel value is zero and the largest pixel value is 255. To reduce statistical variability, the pixel bin size of the pixel intensity histogram can be set larger than unity (e.g., 5). The pixel intensity histogram of that new image frame is stored in buffer memory in the host computer, which already stores the pixel intensity histograms for previous image frames.

Figure 5:
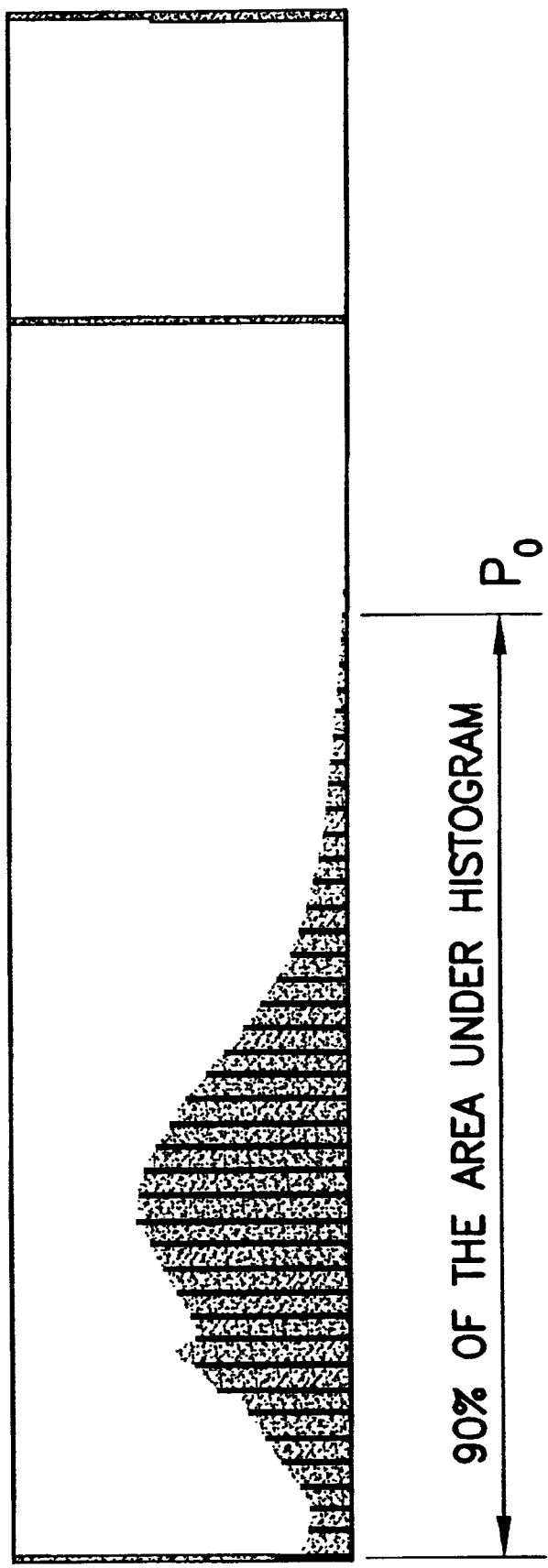
FIG. 5 is a graph showing a marker superimposed on a pixel intensity histogram at a position P0 representing the boundary of the region of the histogram that encompasses 90% of the image grayscale values. The histogram is shown prior to contrast enhancement.

The next step in the process (step 26 in FIG. 4A) is to determine which position or grayscale value P0 (shown in FIG. 5) represents the boundary of the region of the histogram that encompasses 90% of the image grayscale values, i.e., 90% of the total area under the histogram. Levels other than 90% can be used. If the value P0 is greater than the midvalue of the histogram (step 28), the histogram is designated as being "high" (step 30) and is assigned the sign 1; otherwise the histogram is designated as being "low" (step 32 ) and is assigned the sign +1. The midvalue of the histogram equals the average of the maximum and minimum grayscale values in the histogram.

This step determines the skewness of the histogram. The term "skewness" is used in its ordinary sense as understood by persons skilled in the art of statistics, to wit, "a lack of symmetry of a distribution about a central measure; e.g., right skewness corresponds to a right tail declining more slowly than the left tail," as defined in Academic Press Dictionary of Science and Technology, 1992.

Figure 6:
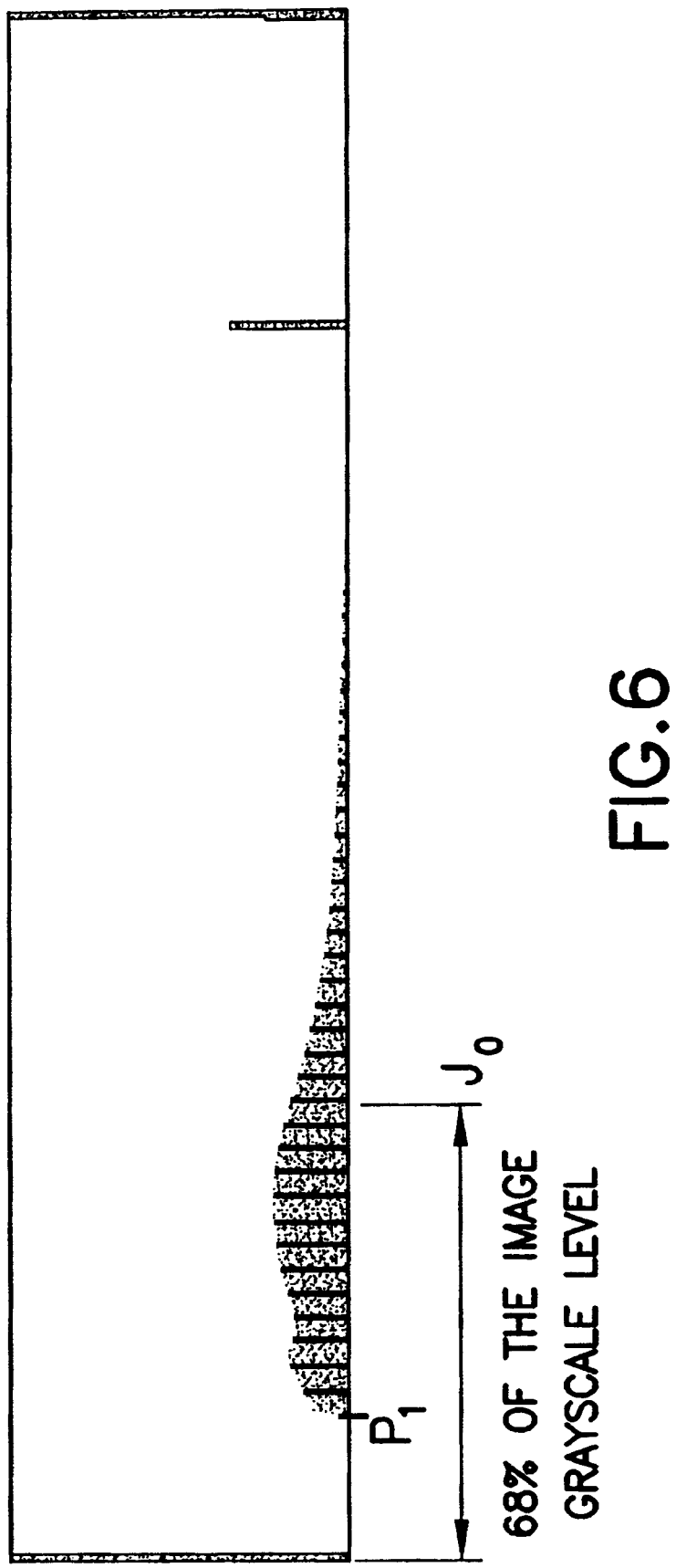
FIG. 6 is a graph showing a marker superimposed on a pixel intensity histogram at a position J0 representing the boundary of the region of the histogram that encompasses 68% of the image grayscale values. The histogram is shown after a first step of contrast enhancement but before a second step of contrast enhancement.

The next stage of the process is contrast enhancement. First, the host computer divides the histogram of the image frame into three regions, each region containing a respective ⅓ of the image grayscale values. One region encompasses a range of the lowest values; another region encompasses a range of the highest values; and the middle region encompasses a range of intermediate values lying between the ranges of highest and lowest values. Then the grayscale values in the region containing the lowest values are reduced by a factor of 10, i.e., are multiplied by ⅒ (step 34 in FIG. 4A), without changing the upper values. For example, if the boundary of the region of lowest values lies at grayscale value P1, then the first step of contrast enhancement will make the histogram essentially zero in the region from P1/10 to P1, as seen in FIG. 6. This step increases the contrast of the image.

The next contrast enhancement step (step 34 in FIG. 4A) is to determine from the histogram which position or grayscale value J0 (shown in FIG. 6) represents the boundary of the region of the histogram that encompasses 68% of the image grayscale values, i.e., 68% of the total area under the histogram. Levels other than 68% can be used. Using the value J0 as the division factor, the host computer is programmed to pass the image grayscale values through a logarithmic filter (step. 38 in FIG. 4B). One embodiment of a logarithmic filtering routine executed by the host computer takes the form of the following pseudocode: (SEE COMPUTER CODE ATTACHMENT ONE)

Where the % symbol represents the modulus operator. The logarithmic filter is designed to suppress the lower grayscale values more than the higher grayscale values. This further increases the contrast, but the higher grayscale values remain substantially the same.

Figure 7:
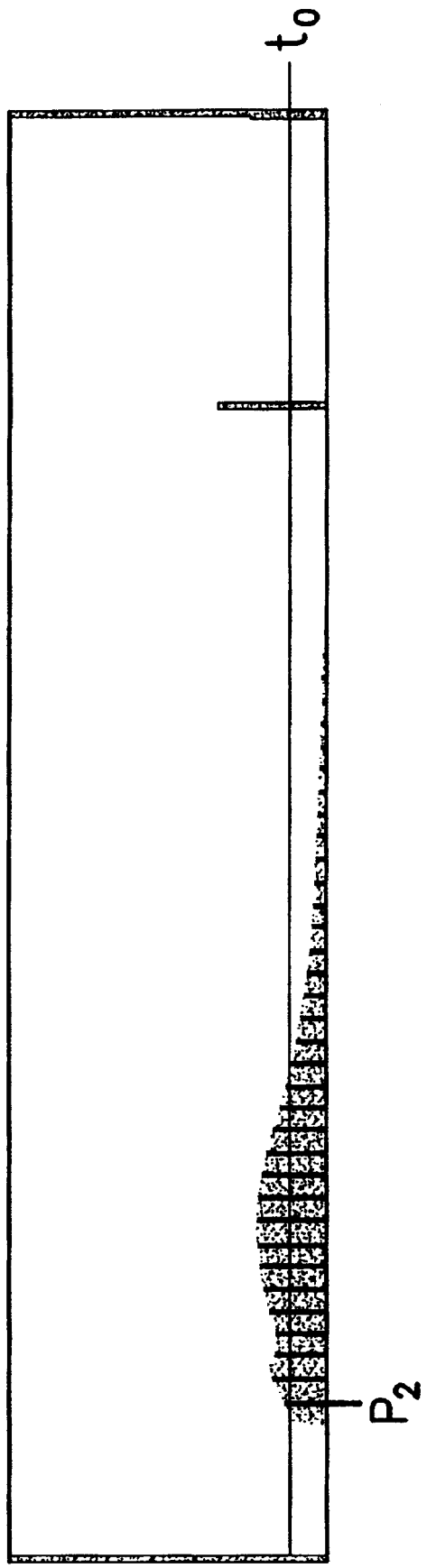
FIG. 7 is a graph showing a marker superimposed on a pixel intensity histogram at a position P2 representing the first image grayscale value above a selected threshold T. The histogram is shown after contrast enhancement.

The host computer may be further programmed to enhance the brightness after enhancing the contrast. Still referring to FIG. 4B, the first step in brightness enhancement is to determine the first grayscale value P2 that has a pixel count above a selected threshold to (step 40 ). FIG. 7 shows a histogram after contrast enhancement with a grayscale value P2 and a pixel count threshold t0. If the region shown in FIG. 5 was previously assigned a "high" condition (step 42 ), the host computer will change the sign of P2 (step 44) and then decrease the brightness by subtracting the value P2 from all grayscale pixel intensity values (step 46). Otherwise, the host computer will increase the brightness by adding the value P2 to all grayscale pixel intensity values (step 46 ). One embodiment of a brightness enhancement routine executed by the host computer takes the form of the following pseudocode: (SEE COMPUTER CODE ATTACHMENT TWO)

Figure 8:
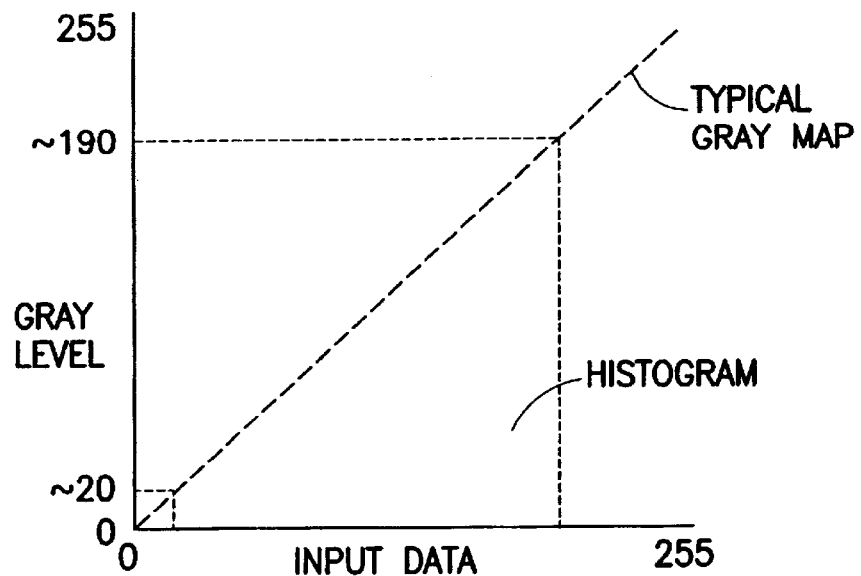
FIG. 8 is a graph showing a typical gray mapping superimposed on the pixel intensity histogram of FIG. 2.

To further improve the image quality of the output image (step 50 in FIG. 4B), the histogram resulting from the above-described enhancements can be stretched using the automatic tissue optimization (ATO) function (step 48 ). FIG. 8 shows a raw data histogram (indicated by the jagged solid line) with a typical gray map superimposed thereon (indicated by the dashed line). This typical gray map outputs a gray-scale value equal to the input value. Given the raw data and the gray map shown in FIG. 8, roughly 171 (20 through 190) gray-scale values out of 256 (0 to 255) are used. For this example, 67% of the gray-scale values are used. The ATO function is designed to provide a more optimal gray mapping in such circumstances.

The contrast and brightness enhancement filter may be activated by the system operator pressing a dedicated button on the operator console of an ultrasound imaging system. Alternatively, the host computer may be programmed to filter each image frame automatically or in response to detection of a predetermined condition.

In a further embodiment of the invention, the host computer is programmed to perform the ATO function before the image frame undergoes contrast and brightness enhancement. When ATO is enabled, the gray mapping is re-optimized based upon certain characteristics of a pixel intensity histogram constructed over a region of interest in the image frame. Then the pixel intensity data is contrast adjusted by transforming each value into the corresponding gray-scale value established by the re-optimized mapping. The pixel intensity values outside the adaptive gray map input range are mapped to a minimum (0) or a maximum (255) gray-scale value. As a result, the contrast of the pixel intensity data of greatest interest is increased.

Figure 9:
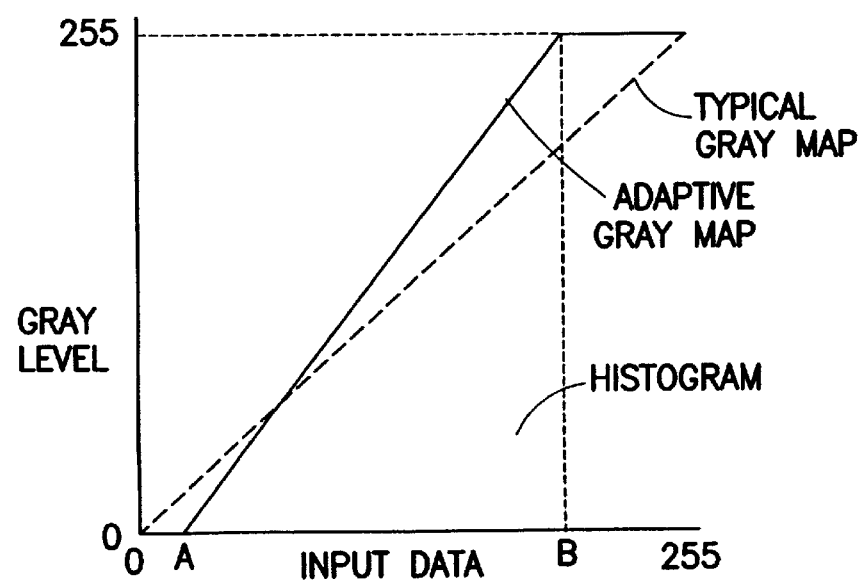
FIG. 9 is a graph showing an adaptively generated gray mapping superimposed on the pixel intensity histogram of FIG. 2.

To accomplish the foregoing, the host computer 8 constructs a new pixel intensity histogram based on the pixel intensity data in only a region of interest of the image frame. The computer then determines the end points of the histogram by searching from each direction. The range of raw pixel intensity values between the end points is the map input range. The computer then generates a gray mapping to fit the map input range, e.g., the end points 0 and 255 of the gray-scale value range are correlated to the end points of the map input range, as seen in FIG. 9. Alternatively, a multiplicity of gray maps can be stored in memory, the computer selecting the most suitable one of the stored maps for performing the gray-scale mapping. The resulting grayscale pixel intensity values are then filtered in the manner previously described.

Although the embodiments have been described with reference to contrast and brightness enhancement by a host computer, it will be appreciated by persons skilled in the art that, in the alternative, the enhanced image frame could be generated by dedicated hardware.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. For example, if the host computer is sufficiently fast, the ATO function could be performed after contrast and brightness enhancement. Therefore, it is intended that the invention not be limited to the particular embodiment disclosed as the best mode contemplated for carrying out this invention, but that the invention will include all embodiments falling within the scope of the appended claims.

As used in the claims, the term "computer" means any programmable data processing device or system of intercommunicating programmable data processing devices capable of performing computations in accordance with a program. In particular, the term "computer" includes, but is not limited to, dedicated processors and general-purpose computers.

PROGRAM LISTING DEPOSIT

---

COMPUTER CODE ATTACHMENT ONE

Int image ; // represents the image
Int image_width ; // width of the image
Int image_height ; // height of the image
for(y = 0; y < image_height; y++) {

-continued

```
for(x = 0; x < image_width; x++) {
    image[y][x] = image[y][x]*log10((10*image[y][x]%256)/J0)
COMPUTER CODE ATTACHMENT TWO If (the 90% of the area under the histogram is above gray value 128)
    sign = -1 else sign = +1
find the value of first grayscale occurs more than t0 times in the image
for(int y = 0; y < image_height ; y++) {
    for(int x = 0; x < image_width; x++) {
        image[y][x] = image[y][x] + sign * P2
```

What is claimed is:

1. An imaging system comprising a data acquisition system for acquiring acoustic data, an image processor for converting acoustic data into a set of pixel intensity values for each image frame, a display monitor for displaying image frames, and a computer programmed to perform the following steps:

(a) computing histogram data from a set of pixel intensity values generated by said image processor, said histogram data comprising counts representing a number of pixels having pixel intensity values belonging to a respective bin, said bins being defined to encompass non-overlapping subsets of pixel intensity values, each subset comprising either a different pixel intensity value or a different range of pixel intensity values;

(b) decreasing the pixel intensity values in bins having pixel intensity values in a first range of lowest pixel intensity values, said first range including a predetermined fraction of a total count of pixel intensity values, and said decrease in pixel intensity values in said first range being implemented by multiplying each pixel intensity value in said first range by a multiplication factor, said multiplication factor being less than unity and greater than zero; and (c) decreasing the pixel intensity values in bins having pixel intensity values in a second range of pixel intensity values excluding at least a third range of highest pixel intensity values, wherein said first through third ranges do not overlap, said decrease in pixel intensity values in said second range being implemented by logarithmic filtering each pixel intensity value in said second range, wherein said display monitor displays an image frame based on pixel intensity values derived by a process that includes at least steps (a) through (c).

2. The system as recited in claim 1, wherein step (c) further comprises the following steps:

determining a division factor pixel intensity value that demarcates a boundary where the count for pixel intensity values less than and including said division factor pixel intensity value is a predetermined fraction of the total count; and using said division factor pixel intensity value as a division factor in said logarithmic filtering.

3. The system as recited in claim 2, wherein said predetermined fraction is equal to about ⅔.

4. The system as recited in claim 1, wherein said predetermined fraction is equal to about ⅓.

5. The system as recited in claim 1, wherein said computer is further programmed to perform the following steps:

(d) in order of increasing pixel intensity values, testing each in a succession of bins to determine whether the bin being tested has a count equal to or in excess of a predetermined threshold;

(e) if a bin has a count equal to or in excess of a predetermined threshold, identifying a brightness enhancement pixel intensity value having a count equal to said predetermined threshold; and (f) changing the value of each pixel intensity value in at least said second and third ranges by said brightness enhancement pixel intensity value.

6. The system as recited in claim 5, wherein said computer is further programmed to determine a skewness state of said histogram, a sign of a change made in said step (f) being dependent on said skewness state.

7. An imaging system comprising a data acquisition system for acquiring acoustic data, an image processor for converting acoustic data into a first set of pixel intensity values for an image, a display monitor for displaying the image, and a computer programmed to perform the following steps:

(a) enhancing a contrast of the image to be displayed by processing said first set of pixel intensity values in accordance with a first algorithm, a result being a second set of pixel intensity values;

(b) enhancing a brightness of the image to be displayed by processing said second set of pixel intensity values in accordance with a second algorithm different than said first algorithm, a result being a third set of pixel intensity values;

(c) further enhancing the contrast of the image to be displayed by applying a mapping to said third set of pixel intensity values, a result being a fourth set of pixel intensity values, wherein said mapping is derived by processing a subset of said third set of pixel intensity values in accordance with a third algorithm different than said first and second algorithms, wherein said subset corresponds to a region of interest in the image to be displayed; and (d) displaying the image as a function of said fourth set of pixel intensity values on said display monitor, wherein said step (a) comprises the following steps:

computing histogram data from said first set of pixel intensity values, said histogram data comprising counts representing a number of pixels having pixel intensity values belonging to a respective bin, said bins being defined to encompass non-overlapping subsets of pixel intensity values, each subset comprising either a different pixel intensity value or a different range of pixel intensity values; and decreasing the pixel intensity values in bins having pixel intensity values in a first range of lowest pixel intensity values, said first range including a predetermined fraction of a total count of pixel intensity values, said decrease in pixel intensity values in said first range being implemented by multiplying each pixel intensity value in said first range by a multiplication factor, said multiplication factor being less than unity and greater than zero.

8. The system as recited in claim 7, wherein step (a) comprises the step of generating a histogram for said first set of pixel intensity values.

9. The system as recited in claim 8, wherein step (b) comprises the step of determining a skewness state of said histogram.

10. The system as recited in claim 7, wherein step (c) comprises the step of generating a histogram for said third set of pixel intensity values.

11. The system as recited in claim 7, wherein said predetermined fraction is equal to about ⅓.

12. The system as recited in claim 7, wherein said step (a) further comprises the step of decreasing the pixel intensity values in bins having pixel intensity values in a second range of pixel intensity values excluding at least a third range of highest pixel intensity values, wherein said first through third ranges do not overlap, said second range including a predetermined fraction of the total count of pixel intensity values, said decrease in pixel intensity values in said second range being implemented by logarithmic filtering each pixel intensity value in said second range.

13. The system as recited in claim 12, wherein said predetermined fraction is equal to about 1/3.

14. The system as recited in claim 12, wherein step (a) further comprises the following steps:

determining a division factor pixel intensity value that demarcates a boundary where the count for pixel intensity values less than and including said division factor pixel intensity value is a predetermined fraction of the total count; and using said division factor pixel intensity value as a division factor in said logarithmic filtering.

15. An imaging system comprising a data acquisition system for acquiring acoustic data, an image processor for converting acoustic data into a first set of pixel intensity values for an image, a display monitor for displaying the image, and a computer programmed to perform the following steps:

(a) enhancing a contrast of the image to be displayed by applying a mapping to said first set of pixel intensity values, a result being a second set of pixel intensity values, wherein said mapping is derived by processing a subset of said first set of pixel intensity values in accordance with a first algorithm, wherein said subset corresponds to a region of interest in the image to be displayed;

(b) further enhancing the contrast of the image to be displayed by processing said second set of pixel intensity values in accordance with a second algorithm different than said first algorithm, a result being a third set of pixel intensity values;

(c) enhancing the brightness of the image to be displayed by processing said third set of pixel intensity values in accordance with a third algorithm different than said first and second algorithms, a result being a fourth set of pixel intensity values; and (d) displaying the image as a function of said fourth set of pixel intensity values on said display monitor, wherein said step (b) comprises the following steps:

computing histogram data from said second set of pixel intensity values, said histogram data comprising counts representing a number of pixels having pixel intensity values belonging to a respective bin, said bins being defined to encompass non-overlapping subsets of pixel intensity values, each subset comprising either a different pixel intensity value or a different range of pixel intensity values; and decreasing the pixel intensity values in bins having pixel intensity values in a first range of lowest pixel intensity values, said first range including a predetermined fraction of a total count of pixel intensity values, said decrease in pixel intensity values in said first range being implemented by multiplying each pixel intensity value in said first range by a multiplication factor, said multiplication factor being less than unity and greater than zero.

16. The system as recited in claim 15, wherein said step (b) further comprises the step of decreasing the pixel intensity values in bins having pixel intensity values in a second range of pixel intensity values excluding at least a third range of highest pixel intensity values, wherein said first through third ranges do not overlap, said second range including a predetermined fraction of the total count of pixel intensity values, said decrease in pixel intensity values in said second range being implemented by logarithmic filtering each pixel intensity value in said second range.

17. The system as recited in claim 16, wherein step (b) further comprises the following steps:

determining a division factor pixel intensity value that demarcates a boundary where the count for pixel intensity values less than and including said division factor pixel intensity value is a predetermined fraction of the total count; and using said division factor pixel intensity value as a division factor in said logarithmic filtering.

18. A method for improving the quality of an image, comprising the following steps:

(a) computing histogram data from a set of pixel intensity values representing an image frame, said histogram data comprising counts representing a number of pixels having pixel intensity values belonging to a respective bin, said bins being defined to encompass non-overlapping subsets of pixel intensity values, each subset comprising either a different pixel intensity value or a different range of pixel intensity values;

(b) decreasing the pixel intensity values in bins having pixel intensity values in a first range of lowest pixel intensity values, said first range including a predetermined fraction of a total count of pixel intensity values, and said decrease in pixel intensity values in said first range being implemented by multiplying each pixel intensity value in said first range by a multiplication factor, said multiplication factor being less than unity and greater than zero;

(c) decreasing the pixel intensity values in bins having pixel intensity values in a second range of pixel intensity values excluding at least a third range of highest pixel intensity values, wherein said first through third ranges do not overlap, said decrease in pixel intensity values in said second range being implemented by logarithmic filtering each pixel intensity value in said second range; and (d) displaying an image frame based on pixel intensity values derived by a process that includes at least steps (a), (b) and (c).

19. The method as recited in claim 18, wherein step (d) further comprises the following steps:

determining a division factor pixel intensity value that demarcates a boundary where the count for pixel intensity values less than and including said division factor pixel intensity value is a predetermined fraction of the total count; and using said division factor pixel intensity value as a division factor in said logarithmic filtering.

20. The method as recited in claim 19, wherein said predetermined fraction is equal to about 2/3.

21. The method as recited in claim 18, wherein said predetermined fraction is equal to about ⅓.

22. The method as recited in claim 18, further comprising the following steps:
(e) in order of increasing pixel intensity values, testing each in a succession of bins to determine whether the bin being tested has a count equal to or in excess of a predetermined threshold;
(f) if a bin has a count equal to or in excess of a predetermined threshold, identifying a brightness enhancement pixel intensity value having a count equal to said predetermined threshold; and
(g) changing the value of each pixel intensity value in at least said second and third ranges by said brightness enhancement pixel intensity value.

23. The method as recited in claim 22, further comprising the step of determining a skewness state of said histogram, a sign of a change made in said step (g) being dependent on said skewness state.

* * * * *